(12) United States Patent  
Lanni

(10) Patent No.: US 7,145,312 B2  
(45) Date of Patent: Dec. 5, 2006

(54) BATTERY COUPLED TO ADAPTER AND TIP

(75) Inventor: Thomas W. Lanni, Laguna Niguel, CA (US)

(73) Assignee: Comarco Wireless Technologies, Inc., Irvine, CA (US)

( * ) Notice: Subject to any disclaimer, the term of this patent is extended or adjusted under 35 U.S.C. 154(b) by 0 days.

(21) Appl. No.: 10/314,008

(22) Filed: Dec. 6, 2002

(65) Prior Publication Data

US 2004/0108833 A1 Jun. 10, 2004

(51) Int. Cl.
*H02J 7/00* (2006.01)

(52) U.S. Cl. .................................................. 320/114
(58) Field of Classification Search .............. 320/114, 320/112, 107, 115, 125, 162; 307/38, 42, 307/155; 429/9; 361/600, 707
See application file for complete search history.

(56) References Cited

U.S. PATENT DOCUMENTS

| | | | | |
|---|---|---|---|---|
| 5,200,685 A | * | 4/1993 | Sakamoto | 320/103 |
| 5,510,691 A | | 4/1996 | Palatov | 320/111 |
| 5,532,524 A | * | 7/1996 | Townsley et al. | 307/64 |
| 5,570,002 A | * | 10/1996 | Castleman | 323/283 |
| 5,602,455 A | * | 2/1997 | Stephens et al. | 320/106 |
| 5,606,242 A | * | 2/1997 | Hull et al. | 320/106 |
| 5,721,481 A | * | 2/1998 | Narita et al. | 320/111 |
| 5,783,927 A | | 7/1998 | Chen | 320/110 |
| 5,977,747 A | | 11/1999 | Huang | 320/115 |
| 6,005,773 A | * | 12/1999 | Rozman et al. | 361/707 |
| 6,054,846 A | * | 4/2000 | Castleman | 323/283 |
| 6,191,552 B1 | * | 2/2001 | Kates et al. | 320/112 |
| 6,198,250 B1 | * | 3/2001 | Gartstein et al. | 320/112 |
| 6,268,711 B1 | | 7/2001 | Bearfield | 320/117 |
| 6,459,175 B1 | * | 10/2002 | Potega | 307/149 |
| 6,667,599 B1 | | 12/2003 | Stone et al. | 320/112 |
| 6,693,413 B1 | * | 2/2004 | Lanni | 323/297 |
| 6,765,368 B1 | | 7/2004 | Stone et al. | 320/131 |
| 6,831,848 B1 | * | 12/2004 | Lanni | 363/144 |
| 6,836,101 B1 | * | 12/2004 | Lanni | 323/274 |
| 2003/0085621 A1 | * | 5/2003 | Potega | 307/18 |

FOREIGN PATENT DOCUMENTS

EP        0 469 533 A2      2/1992

OTHER PUBLICATIONS

Smart Battery Data Specification, Revision 1.1, Dec. 11, 1998, http://www.sbs-forum.org/specs/errata_sbdat110a.pdf, pp. 1–49.*

Embedded Systems, How to Talk Smart, 1997, http://www.embedded.com/97.feat9611.htm.*

European Search Report for European Patent Application EP 03 25 7677, dated Jun. 16, 2005, European Patent Office.

Rodriguez et al., "A Novel Integrated SMPS with Battery Backup and Power Factor Correction," Departamento de Electronica, Cuernavaca, Mor. MEXICO, Interior Palmira s/n Apdo. 5–164, CP 62050.

* cited by examiner

*Primary Examiner*—Pia Tibbits
(74) *Attorney, Agent, or Firm*—Pillsbury Winthrop Shaw Pittman LLP

(57) ABSTRACT

A system has an adapter/charger to receive power from a power source and output a first DC power signal. A universal battery receives the first DC power signal directly from the adapter/charger and to supplies a second DC power signal, and the universal battery includes at least one battery cell chargeable by the first DC power signal. A power tip receives the second DC power signal and outputs a third DC power signal useable by an electronic device. The power tip includes control circuitry to output a programming signal to program a magnitude of the first DC power signal.

33 Claims, 8 Drawing Sheets

BATTERY COUPLED TO ADAPTER AND TIP

BACKGROUND

1. Technical Field

An embodiment of this invention relates to the field of portable batteries, and more specifically, to a portable battery for use with a single adapter/charger and a set of electronic devices having differing power requirements.

2. Description of the Related Arts

Supplying continuous DC power when away from an AC power source for more than a few hours often becomes a problem for a portable electronic device such as a laptop computer or a personal digital assistant (PDA). Such portable devices typically have a built-in space to receive a rechargeable battery pack as a primary power source when the device is in portable use. The rechargeable battery pack typically lasts only a few hours. Once the rechargeable battery pack is exhausted, the electronic device has to be turned off. In order to continue its operation, a user can bring along a back-up battery pack, which is identical in shape and design with the pack installed in the battery pack. Once the first installed battery pack is discharged to a low level after few hours of operation, the backup battery pack can be installed to replace the first installed battery pack for continuous operation. However, before the battery replacement, the device often must be powered down properly. In the case of a laptop computer, before it is turned off, the files which the computer is executing must be properly closed and some files often must be saved in order to preserve the works performed on the computer, which may be lost either due to the total exhaustion of power supply or its improper powering down. The powering down process typically generates interference and interruption to a user that is not only annoying but also decreases the user's effectiveness and productivity.

Operation with a portable electronic device and a conventional AC/DC adapter has another difficulty. There is a restriction that the installed battery pack is generally not charged when the electronic device is in operation due to the fact that the input current is mostly used for supporting the operation of the electronic device. Thus, in order to charge a battery pack, the device usually has to be turned off. In the case of a slow charging, either by a built-in charging circuit or the adapter, in order to fully charge the battery, the electronic device has to be temporarily out of service in the charging period. Again, the limitation of not able to efficiently and rapidly charge the battery pack reduces the usefulness and productivity of the portable electronic device.

There are backup batteries in the art that are used to supply power to electronic devices. One such backup battery system includes an adapter, an input interface, a charging circuit, the backup battery, and an output interface that is directly coupled to the electronic device being powered. However, such a system is deficient because the original adapter of the electronic device must be used while the backup battery is being powered. As disclosed in the prior art, the original adapter of the electronic device is utilized while: (a) supplying DC power to the electronic device, and (b) powering the portable backup battery. The prior art discloses a universal adapter interface that hooks up to the original adapter of the electronic device.

However, it is inefficient to have to utilize the original adapter of the electronic device being powered. For example, if a user is powering the backup battery while it is hooked up to a portable laptop computer, the user must utilize the original adapter of the portable laptop computer. If the user then decides to power a cellular phone, or other electronic device, the user must remove the adapter for the portable laptop computer, and replace it with the adapter for the cellular phone so that (a) the cellular phone, and (b) the backup battery, can be simultaneously powered.

Accordingly, systems in the prior art are deficient because a user must change adapters when the user decides to power different electronic devices while the backup battery charges. Also, due to the bulkiness of the adapters, it is awkward for a user to have to since multiple adapters to power different electronic devices.

DETAILED DESCRIPTION

An embodiment of the invention is directed to a portable backup battery pack which may be directly coupled to an adapter/charger and a power tip in order to charge while an electronic device is receiving power. The adapter/charger may be coupled to a power source. The power source may be an A/C power source such a common household electric outlet. Alternatively, the power source may be a DC power source such as an automobile (e.g., powered through a cigarette lighter) or an electrical outlet on an airplane. The adapter/charger may be directly coupled to the portable backup battery pack. The portable backup battery pack may be charged while an electronic device is also powered. The "power tip" may provide an interface between the portable backup battery pack and the electronic device. The power tip may receive power, and then convert the power into an amount necessary to power the electronic device. Electronic devices requiring different amounts of power may utilize different power tips. However, the power tip is the only element which needs to be changed when electronic devices having different power requirements are utilized which the portable backup battery charges. In other words, a common adapter/charger is used, regardless of the electronic device receiving the power. The power tips may each be physically small. Accordingly, it is not problematic for a user to carry power tips for multiple electronic devices.

Figure 1A:
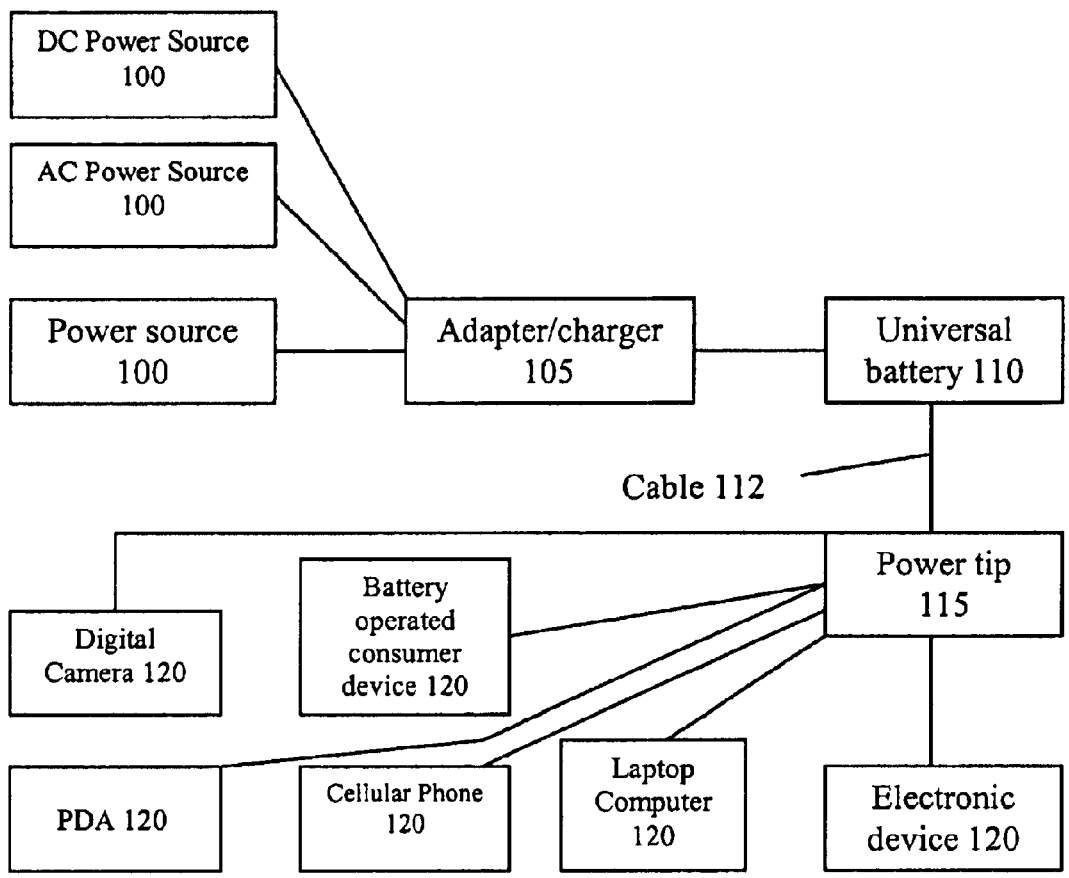
FIG. 1A illustrates a system diagram of the universal battery according to an embodiment of the invention.

FIG. 1A illustrates a system diagram of the universal battery 110 according to an embodiment of the invention. As shown, a power source 100 is directly coupled to an adapter/charger 105. As discussed above, the power source may be an A/C source such as that of an ordinary household electric outlet (e.g., 110 V RMS, 60 Hz). The power source may also be from an electric outlet in a foreign country which utilizes a different voltage and/or A/C frequency. Alternatively, the power source 100 may be a DC source such as an automobile or an electric outlet on an airplane.

The adapter/charger 105 may convert an A/C input signal into a suitable DC signal. Alternatively, if the power source provides a DC input signal, the adapter/charger 105 may output a DC signal having a different magnitude than that of the power source 100. The adapter/charger 105 may be directly connected to the universal battery 110 via a cable. In other words, no additional interfacing circuitry is necessary between the universal battery 110 and the adapter/charger 105. The universal battery 110 may be coupled to a power tip 115 via a cable 112. The power tip 115 may be connected to an electronic device 120 being powered, such as a cellular phone, a PDA, a portable laptop computer, a digital camera, a digital camcorder, or any other portable electronic device 120, for example. The power tip 115 may contain circuitry to supply power to the electronic device 120. Different power tips 115 may be utilized for electronic devices 120 having different power requirements. For example, a different power tip 115 would be used for an electronic device 120 requiring 6 Volts, than would be used for an electronic device 120 requiring 12 Volts. However, regardless of the electronic device 120 being powered, the same adapter/charger 105 and universal battery 110 may be utilized. A user may carry a set of different power tips 115 when transporting the universal battery 110. Each of the power tips 115 may have a different physical size. For example, a power tip 115 for a laptop computer may be larger or smaller than a power tip 115 for a PDA. Each of the power tips 115 may be physically small. Accordingly, because they are not bulky, it is not inconvenient for a user to transport multiple power tips to use with the universal battery 110.

Figure 1B:
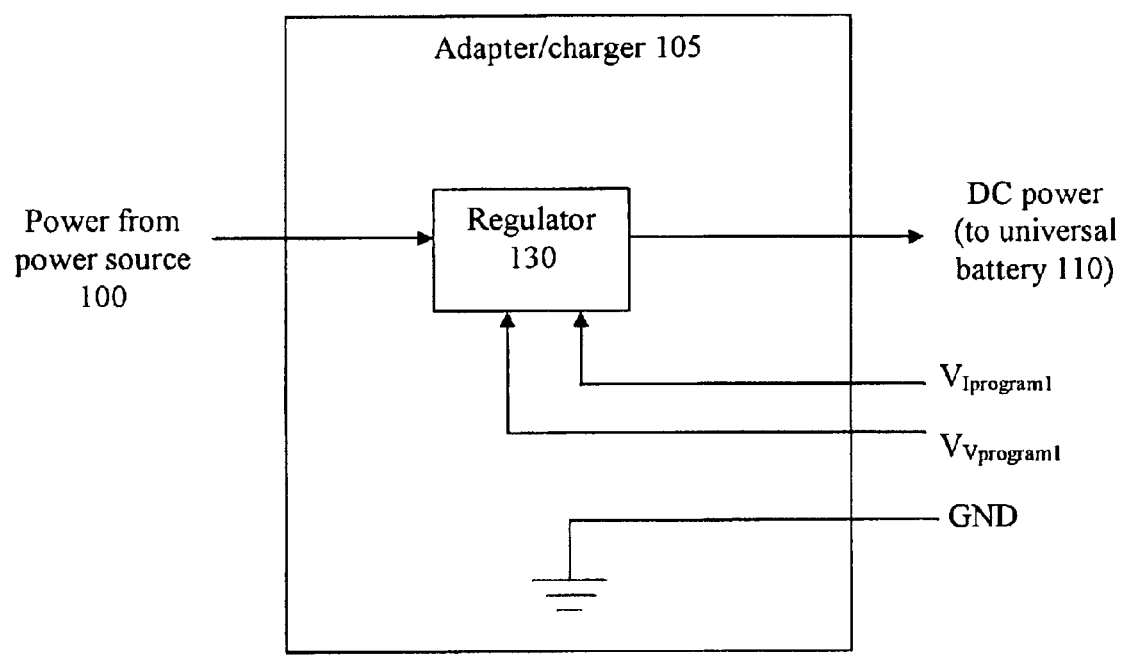
FIG. 1B illustrates an adapter/charger according to an embodiment of the invention.

FIG. 1B illustrates an adapter/charger 105 according to an embodiment of the invention. As shown, the adapter/charger 105 may include a regulator 130. The regulator 130 may have a function of receiving power (e.g., A/C or DC power) from the power source 100, and outputting a DC power signal to the universal battery 110. The adapter/charger 105 may be utilized with different electronic devices 120 having different power requirements. The DC power signal output from the adapter/charger 105 may be programmed (i.e., the voltage of the DC power signal may be set) based on the power requirements of the electronic device 120. For example, if the electronic device 120 requires 9 volts DC, the adapter/charger 105 may be programmed to provide 9 volts DC. However, if the electronic device 120 only requires 6 volts DC, the adapter/charger may be programmed to provide 6 volts DC.

The regulator 130 may receive a voltage programming voltage (i.e., $V_{Vprogram1}$) and a current programming voltage (i.e., $V_{Iprogram1}$) from the universal battery 110 ($V_{Vprogram1}$ and $V_{Iprogram1}$ are set by a power junction device 202, as discussed below with respect to FIG. 2), and may share a ground reference (i.e., GND) with the universal battery 110 and the power tip 115. $V_{Vprogram1}$ may be utilized to set the magnitude of the voltage of the DC power signal output by the adapter/charger 105, and $V_{Iprogram1}$ may be utilized to limit the magnitude of the current. In an embodiment, the regulator 130 may receive $V_{Vprogram1}$ and output a DC power signal having a voltage that is a predetermined multiple of $V_{Vprogram1}$. For example, if the predetermined multiple is 3.2, the magnitude of the voltage of the DC power signal output is equal to 3.2 times $V_{Vprogram1}$. The magnitude of the current output by the regulator 130 may also be limited in a similar manner based on the magnitude of $V_{Iprogram1}$.

Figure 1C:
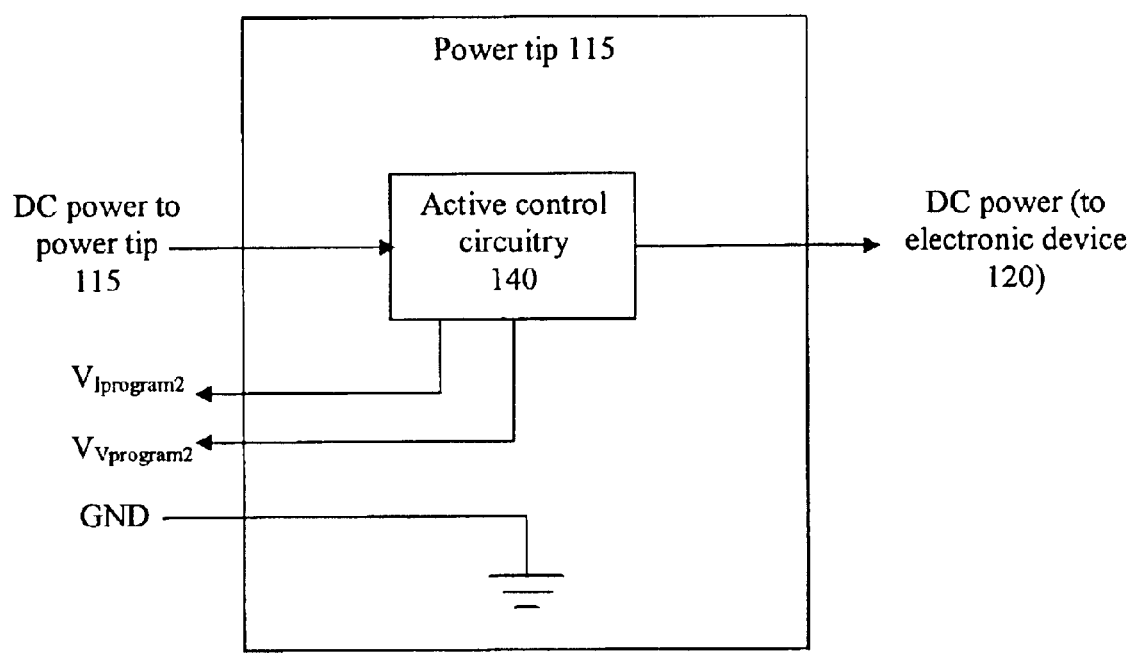
FIG. 1C illustrates a power tip according to an embodiment of the invention.

FIG. 1C illustrates a power tip 115 according to an embodiment of the invention. The power tip 115 may have active control circuitry 140 to receive the DC power signal from the adapter/charger 105 (via the universal battery 110), and output the DC power signal to the electronic device 120. The active control circuitry 140 may include a voltage regulator, for example, to set $V_{Iprogram2}$ and $V_{Vprogram2}$. $V_{Vprogram2}$ may be utilized to set the magnitude of the voltage output by the universal battery 110, and $V_{Iprogram2}$ may be utilized to limit the magnitude of current output by the universal battery. A single power tip 115 may be utilized be provide the DC power to an electronic device 120 having predetermined power requirements (e.g., 9 volts DC). If an electronic device 120 having different power requirements is to be utilized with the system, then a different power tip 115 may be utilized. Each power tip 115 may include active circuitry 140 having different characteristics. For example, in an embodiment where an electronic device 120 requires 9 volts DC, and a regulator in the power junction device 202 provides a DC output signal that is 3 times the size Of $V_{Vprogram2}$, the active control circuitry 140 may be utilized to set $V_{Vprogram2}$ to 3 volts, so that 9 volts DC may be output. The power tip 115 may share a common GND with the universal battery 110 and the adapter/charger 105.

Figure 1D:
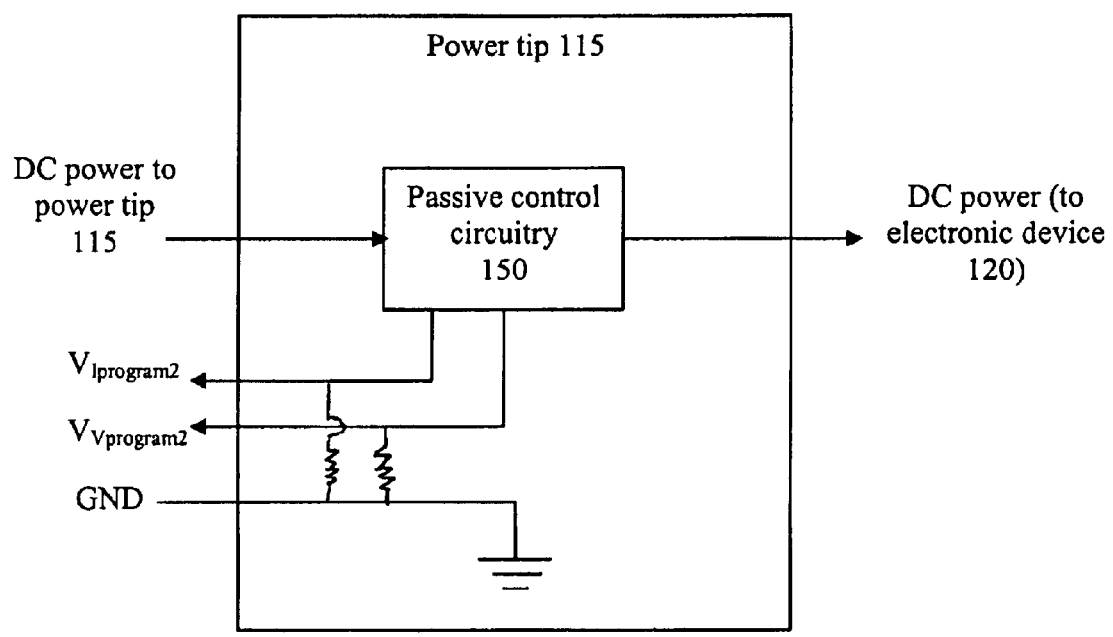
FIG. 1D illustrates an alternative power tip according to an embodiment of the invention.

FIG. 1D illustrates an alternative power tip 115 according to an embodiment of the invention. The power tip 115 of the embodiment shown in FIG. 1D may include passive control circuitry 150 to receive the DC power from the adapter/charger 105 (via the universal battery 110) and output the DC power to the electronic device 120. The passive control circuitry 150 may include a set of resistors, for example. The passive control circuitry 150 may receive DC power and generate $V_{Vprogram2}$ and $V_{Iprogram2}$, which are output to the universal battery 110 to set the magnitude of the DC power signal output by the universal battery 110.

Figure 2:
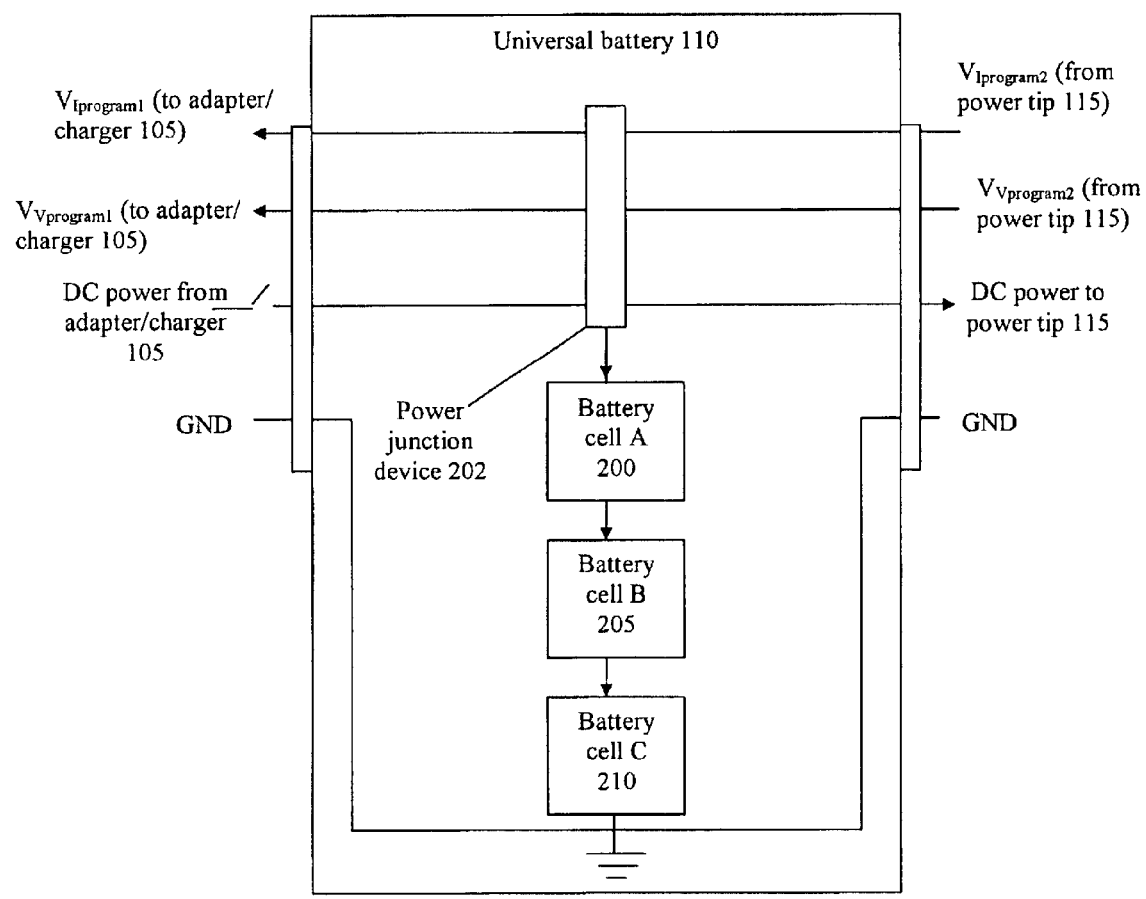
FIG. 2 illustrates a cut-away view of the universal battery according to an embodiment of the invention.

FIG. 2 illustrates a cut-away view of the universal battery according to an embodiment of the invention. As shown, the universal battery 110 may receive DC power from the adapter/charger 105 and may allow the DC power to charge battery cells (e.g., battery cell A 200, battery cell B 205, and battery cell C 210). An input port 215 may receive the DC power. The universal battery 110 may also allow the DC power from the adapter/charger 105 to flow out of an output port 220 and directly to the power tip 115. In an embodiment, the universal battery 110 may give priority to the electronic device 120. In other words, the universal battery 110 may allow the DC power required by the electronic device 120 to flow directly through to the power tip 115, which supplies a voltage to the electronic device 120. Any of the DC power from the adapter/charger 105 that is not utilized by the electronic device 120 may be utilized to charge the battery cells (e.g., battery cell A 200, battery cell B 205, and battery cell C 210). Therefore, if the electronic device 120 requires use of 80% of the power supplied by the adapter/charger 105, then the remaining 20% is available to charge the battery cells (battery cell A 200, battery cell B 205, and battery cell C 210). However, if the electronic device 120 requires 90% of the power from the adapter/charger 105, then only the remaining 10% of the power may be available to charge the battery cells (battery cell A 200, battery cell B 205, and battery cell C 210). Also, if the electronic device 120 requires 100% of the DC power from the adapter/charger 105, then no power is available to charge the battery cells (battery cell A 200, battery cell B 205, and battery cell C 210).

A power junction device 202 may serve to make some of the power available to the electronic device 120, and the remainder to the battery cells. The power junction device 202 may include a regulation device to receive $V_{Vprogram2}$ and $V_{Iprogram2}$ from the power tip 115 to set the DC voltage output and limit the current output. The power junction device 202 may also determine and transmit $V_{Vprogram1}$ and $V_{Iprogram1}$ to the adapter/charger 105 to set the DC voltage output therefrom and limit the output current.

Figure 3:
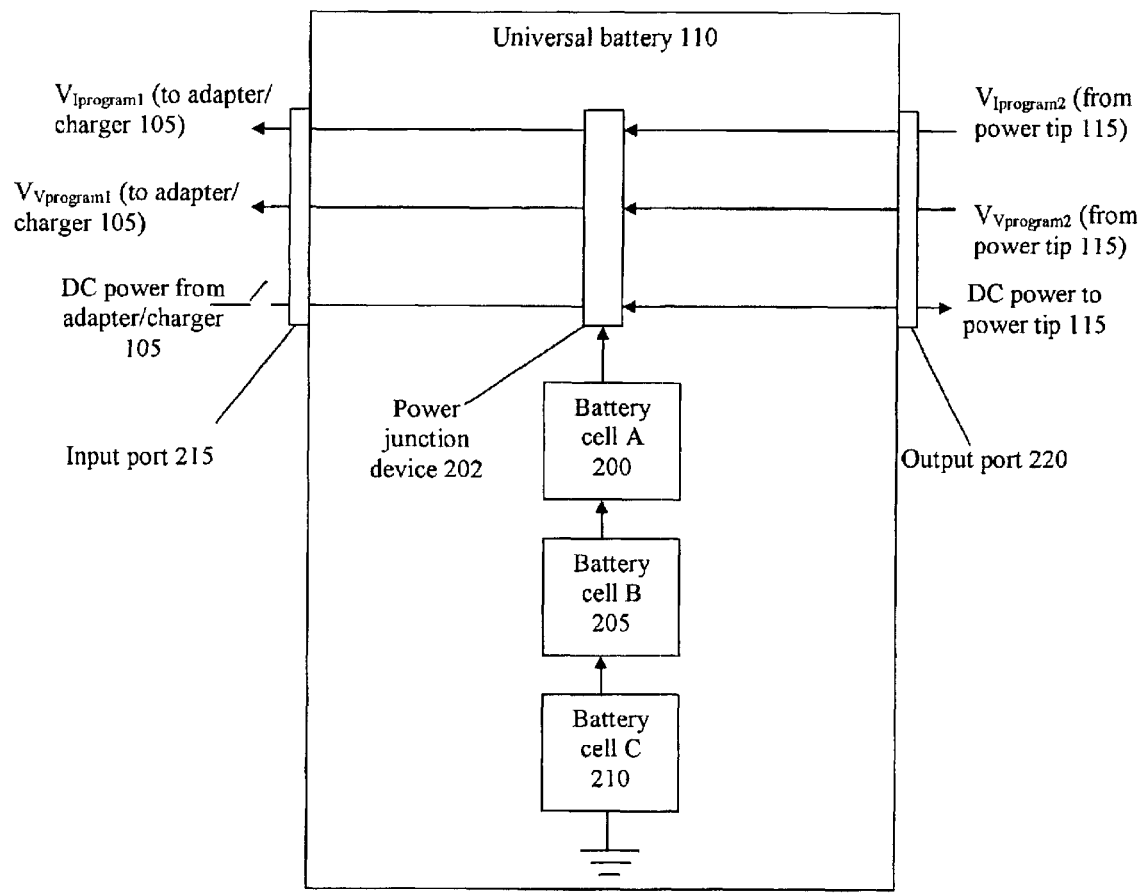
FIG. 3 illustrates a cut-away view of the universal battery supplying power to an electronic device according to an embodiment of the invention.

FIG. 3 illustrates a cut-away view of the universal battery supplying power to an electronic device 120 according to an embodiment of the invention. When the power source 100 is removed (e.g., by unplugging a cord plugged into an outlet), the universal battery 110 may provide power to the power tip 115, which may in turn provide power to the electronic device 120, as if still plugged into an A/C or DC power source 100.

As shown, power may flow from battery cells A 200, B 205, and C 210 out of the universal battery 120. Each of the battery cells A 200, B 205, and C 210 may provide a voltage of 1.5 Volts, for example. The voltage between the top battery cell (i.e., A 200) and ground may therefore be 4.5 V. Additional battery cells may be utilized, and each of the battery cells may provide voltages of greater or less than 1.5 V, depending on the application of the universal battery 110.

Figure 4:
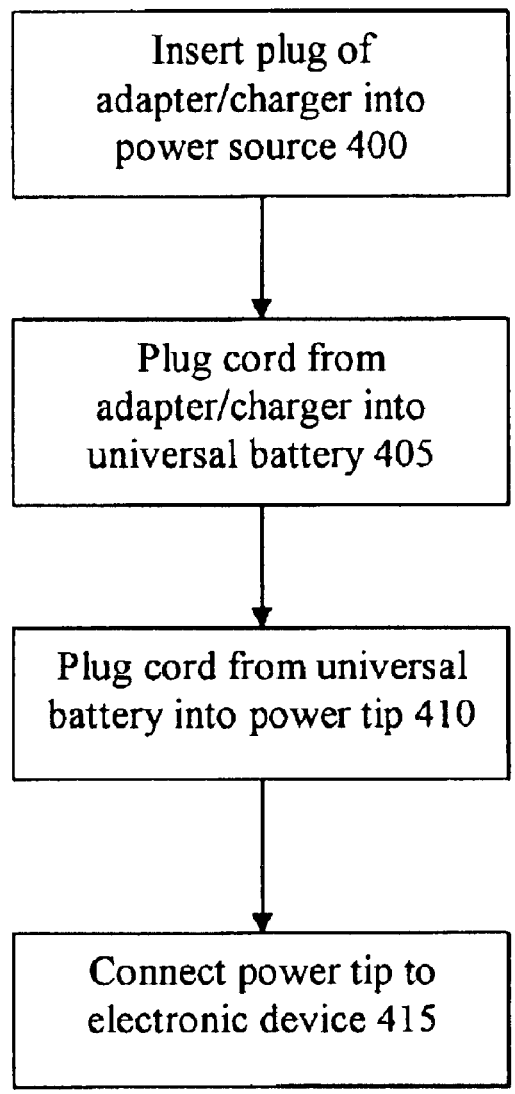
FIG. 4 illustrates a method of hooking up the universal battery according to an embodiment of the invention.

FIG. 4 illustrates a method of hooking up the universal battery 110 according to an embodiment of the invention. First, a user may insert 400 a plug of the adapter/charger 105 into a power source 100, such as an electric outlet, or a cigarette lighter of an automobile, for example. Next, the user may plug 405 a cord from the adapter/charger 105 into the universal battery 110. The user may then plug 410 a cord from the universal battery 110 into the power tip 115. Finally, the user may connect 415 the power tip 115 to the electronic device 120.

Figure 5A:
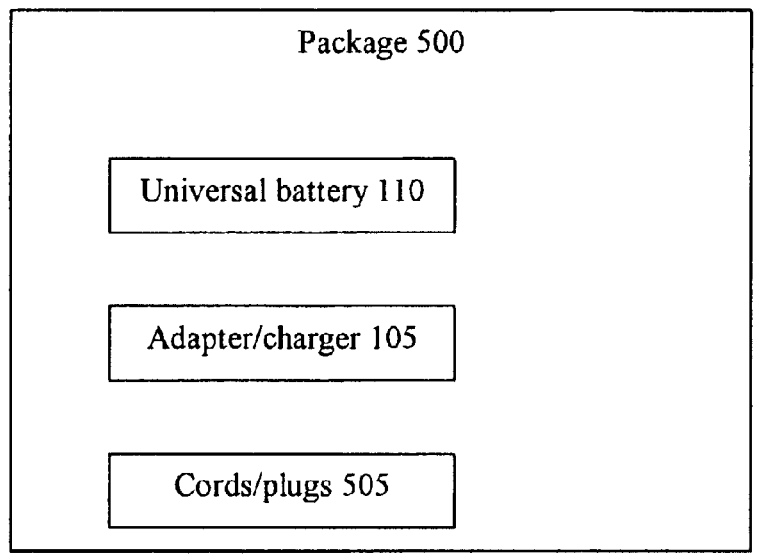
FIG. 5A illustrates a package in which the universal battery may be stored according to an embodiment of the invention.

FIG. 5A illustrates a package 500 in which the universal battery 110 may be stored according to an embodiment of the invention. As illustrated, the package 500 may include the universal battery 110, the adapter/charger 105, as well as any cords/plugs 505 necessary to couple the adapter/charger 105 to a power source 100, and to couple the adapter/charger 105 to the universal battery 110.

Figure 5B:
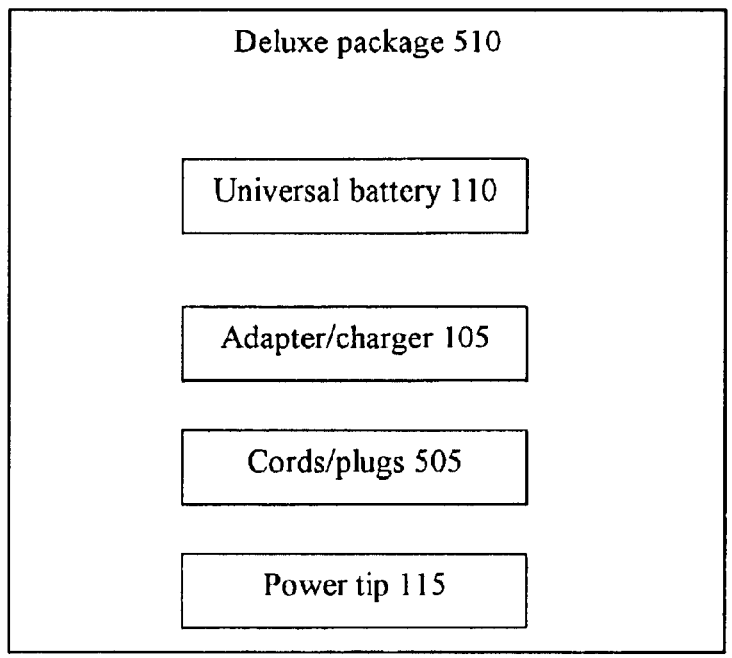
FIG. 5B illustrates an deluxe package in which the universal battery may be stored according to an embodiment of the invention.

FIG. 5B illustrates an deluxe package 510 in which the universal battery 110 may be stored according to an embodiment of the invention. As illustrated, the deluxe package 510 may include the universal battery 110, the adapter/charger 105, as well as any cords/plugs 505 necessary to couple the adapter/charger to a power source 100, and to couple the adapter/charger 105 to the universal battery 110. The deluxe package 510 may also include a power tip 115 to interface between the universal battery 110 and an electronic device 120. Alternatively, the deluxe package 510 may include multiple power tips 115 to supply power to electronic devices 120 having differing power requirements.

While the description above refers to particular embodiments of the present invention, it will be understood that many modifications may be made without departing from the spirit thereof. The accompanying claims are intended to cover such modifications as would fall within the true scope and spirit of an embodiment of the present invention. The presently disclosed embodiments are therefore to be considered in all respects as illustrative and not restrictive, the scope of an embodiment of the invention being indicated by the appended claims, rather than the foregoing description, and all changes which come within the meaning and range of equivalency of the claims are therefore intended to be embraced therein.

What is claimed is:

1. A system, comprising:
   an adapter to receive power from a power source and output a first DC power signal;
   a battery to receive the first DC power signal from the adapter and to supply a second DC power signal in response to the first DC power signal, wherein the battery includes at least one battery cell chargeable by the first DC power signal; and
   a power tip to receive the second DC power signal from the battery and output a third DC power signal useable by an electronic device, wherein the power tip includes control circuitry to output a programming signal, wherein a power junction device in the battery receives the programming signal from the power tip and sets the second DC power signal in response to the programming signal.

2. The system of claim 1, wherein the power source provides A/C power.

3. The system of claim 1, wherein the power source provides DC power.

4. The system of claim 1, wherein the electronic device is a laptop computer.

5. The system of claim 1, wherein the electronic device is a cellular phone.

6. The system of claim 1, wherein the electronic device is a personal digital assistant (PDA).

7. The system of claim 1, wherein the electronic device is a digital camera.

8. The system of claim 1, wherein the electronic device is a digital camcorder.

9. The system of claim 1, wherein the electronic device is a battery operated consumer device.

10. The system of claim 1, wherein the control circuitry includes active circuitry and the active circuitry includes a voltage regulator.

11. The system of claim 1, wherein the control circuitry includes passive circuitry, the passive circuitry including at least one resistor.

12. The system of claim 1, further including a cable to couple the battery to the power tip.

13. A rechargeable battery, comprising:
   an input port to receive a first DC power signal from an adapter, and output a programming signal to the adapter;
   at least one battery cell chargeable by the first DC power signal;
   an output port to receive the programming signal from a cower tip and supply a second DC power signal to an electronic device via the power tip; and
   a power junction device to receive the programming signal from the output port and to set the second DC power signal in response to the programming signal.

14. The rechargeable battery of claim 13, wherein the electronic device is a laptop computer.

15. The rechargeable battery of claim 13, wherein the electronic device is a cellular phone.

16. The rechargeable battery of claim 13, wherein the electronic device is a personal digital assistant (PDA).

17. The rechargeable battery of claim 13, wherein the electronic device is a digital camera.

18. The rechargeable battery of claim 13, wherein the electronic device is a digital camcorder.

19. The rechargeable battery of claim 13, wherein the electronic device is a battery operated consumer device.

20. A method of using a battery, comprising:

coupling an adapter to a power source, wherein the adapter outputs a first DC power signal;

coupling the adapter to the battery, wherein the battery includes at least one battery cell chargeable by the first DC power signal, and the battery supplies a second DC power signal;

coupling the battery to a power tip, wherein the power tip includes control circuitry to output a programming signal and coupling the power tip to an electronic device, wherein the battery receives the programming signal and sets the second DC power signal based on the programming signal.

21. The method of claim 20, further including coupling the battery to the power tip via a cable.

22. The method of claim 20, wherein the power source provides A/C power.

23. The method of claim 20, wherein the power source provides DC power.

24. The method of claim 20, wherein the electronic device is a laptop computer.

25. The method of claim 20, wherein the electronic device is a cellular phone.

26. The method of claim 20, wherein the electronic device is a personal digital assistant (PDA).

27. The method of claim 20, wherein the electronic device is a digital camera.

28. The method of claim 20, wherein the electronic device is a digital camcorder.

29. The method of claim 20, wherein the electronic device is a battery operated consumer device.

30. The method of claim 20, wherein the control circuitry includes active circuitry, and the active circuitry includes a voltage regulator.

31. The method of claim 20, wherein the control circuitry includes passive circuitry, and the passive circuitry includes at least one resistor.

32. The system of claim 1, wherein the battery has an input port that receives the first DC power signal from the adapter and also sends the programming signal to the adapter.

33. The method of claim 20, wherein the battery also sends the programming signal to the adapter.

* * * * *